Oct. 30, 1934.　　　C. S. BRAGG　　　1,978,563

BRAKE DRUM

Original Filed Dec. 31, 1930　　2 Sheets-Sheet 1

INVENTOR
Caleb S. Bragg
BY
Louis Russell Whitaker
ATTORNEY

Oct. 30, 1934.        C. S. BRAGG        1,978,563
BRAKE DRUM
Original Filed Dec. 31, 1930    2 Sheets-Sheet 2

INVENTOR
Caleb S. Bragg
BY
Louis Prevost Whitake
ATTORNEY

Patented Oct. 30, 1934

1,978,563

UNITED STATES PATENT OFFICE 1,978,563

BRAKE DRUM

Caleb S. Bragg, Palm Beach, Fla.

Original application December 31, 1930, Serial No. 505,821. Divided and this application June 7, 1932, Serial No. 615,785

8 Claims. (Cl. 188—218)

My invention consists in the novel features hereinafter described, reference being had to the accompanying drawings, which show embodiments of my invention selected by me for purposes of illustration, and the said invention is fully disclosed in the following description and claims.

This application is a division of my former application for Letters Patent of the United States filed December 31st, 1930, and given Serial Number 505,821.

My invention consists in a new friction element for use in brake mechanism or clutch mechanism for automotive vehicles, although it may be embodied in any other forms of friction apparatus for any purpose in which its use may be desirable. My invention is particularly advantageous in brake mechanism for automotive vehicles, and especially in the construction of brake drums therefor.

Brake drums formed of sheet steel, stamped or pressed by suitable dies into final form with hub apertures and bolt holes, are used practically on all automotive vehicles except the very heavy models, on account of their lightness and low cost of manufacture. In order to form these drums by stamping or pressing, it is necessary to use a comparatively soft steel, with the result that the braking flanges of the drums are easily scored by frictional engagement with the other braking element, which is usually the brake shoes in the internal expanding type of brake mechanism, or a brake band in the internal expanding type of brake mechanism, or a brake band in the external contracting type of brake mechanism, the former type being more usual as the latter type has been practically abandoned. It has been found that brake shoe pressures, which are otherwise practical, distort the flange into an oval shape, and it has also been found that the frictional heat developed in braking, tends to distort the braking flange of the drum, and in both cases appreciably reduce the area of frictional contact between the drum flange and the opposed braking element, and increase the pressure on the remaining contact surfaces, which may cause excessive heat, wear and scoring. It has been proposed to form an angular reinforcing lip at the outer edge of the braking flange, but this does not prevent distortion of the flange between the lip and the body or disc of the drum. It has also been proposed to provide the flange wtih an exterior L or U shaped reinforcing band. This adds to the cost of manufacture of the drum, and also adds to the weight and does not entirely prevent the distortion of portions of the braking flange adjacent to the reinforcing band.

My invention consists primarily in a pressed brake drum of steel or other suitable material in sheet or other form having its annular braking flange distorted by bending contiguous portions thereof while either hot or cold, into different spaced relation to the axis of rotation of the drum, to form a circular series of corrugations disposed transversely of the drum flange, (or substantially parallel to the axis of rotation of the drum). The corrugations are preferably formed by bending portions of the braking flange (which is of substantially uniform thickness throughout) alternately outwardly and inwardly along lines substantially parallel with the axis of the drum, and preferably without materially thinning the metal of the flange. These transverse corrugations impart great strength and stiffness to the flange at all portions around the same, and throughout its entire width, to withstand all practical braking pressures, and also the highest temperatures to which it is likely to be subjected, without appreciable distortion. I wish it to be understood, clearly, that the formation of the circular series of transversely disposed distorted portions or corrugations in the braking flange, has as its primary purpose the stiffening of the flange to resist distortion by braking pressure, or heat of friction, and are not to be confused with an occasional indentation at remote intervals for the purpose of securing merely an interlocking engagement with a co-operating metallic part.

According to my invention, the circular series of transversely distorted portions or corrugations are of such size and form and are located sufficiently close to each other throughout the entire circular extent of the flange, as to materially add to the strength and stiffness of the flange in the manner previously described.

The transversely distorted or corrugated braking flange is preferably provided at its edges with inwardly extending annular flanges preferably integral therewith, one of which may form the means of attaching the drum to a rotary part, and the other of which forms an annular lip at the outer edge of the drum flange, which adds to its strength and rigidity. In some instances the annular attaching portion of the drum may be likewise provided with distorted portions to increase the strength thereof, and the transverse corrugations of the braking flange may be extended around the shoulder at the junction of the attaching portion and braking flange and radially of the attaching portion or flange, to further stiffen the drum.

It will be understood that the distorted portions or corrugations affect both faces of the braking flange, and that a projection on one face will have a corresponding indented portion on the other face.

I prefer to provide the inner transversely distorted or corrugated face of the braking flange with a friction lining having its flange engaging surface correspondingly distorted or corrugated to conform to or fit the inequalities of the surface of the braking flange, the inner face of said lining being smooth and substantially cylindrical and truly coaxial with the axis of rotation of the drum, said lining being secured with respect to the braking flange of the drum, against movement relatively thereto. The opposed friction element, ordinarily the brake shoes of an internal expanding brake mechanism, act therefore directly upon the inner face of the lining, and do not come into contact with the drum. My invention has the advantage of permitting the use of the present type of coacting brake elements, i. e., brake shoes, which however preferably have metallic faces for engaging the cylindrical faces of the lining, and these metal surfaces, which may be integral with or secured to the shoes, may be made of such material as desired, so that scoring thereof will be largely obviated, while the brake drum and coacting element or elements can be readily assembled or separated in the usual manner.

Referring to the accompanying drawings.

Figure 1:
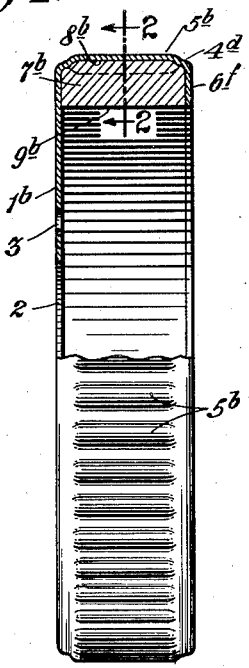
Fig. 1 is an elevation, partly in section, showing a brake drum and lining embodying my invention.

Referring to the form of brake drum illustrated in Figs. 1, 2 and 3, 1b represents the attaching portion of the drum, which, as shown, is in the form of an annular flange extending inwardly from the inner edge of the braking flange, providing the central aperture, 2, and if desired provided with a circular series of bolt holes, 3, 3 (or other suitable means) whereby the drum may be attached to a wheel, hub or other rotary part, or it may be welded or attached in any other manner. 4d represents the braking flange disposed substantially perpendicularly to the attaching portion, 1b, and having a circular series of distorted portions extending transversely of the braking flange and bent alternately outwardly and inwardly to form transverse corrugations, 5b, and substantially parallel to the axis of the drum. The outer edge of the braking flange is provided with an inwardly extending annular lip or flange, 6f. The transverse corrugations, 5b, may be made to extend nearly the entire distance between the attaching portion, 1b, and the inwardly extending lip, 6f, if desired, and as shown in Fig. 1, and will impart great strength and stiffness to the braking flange, as will be readily understood.

It will be understood that any drum formed of sheet steel or other suitable sheet wrought metal, may be stamped, pressed or rolled into the final form described, from a suitable blank without any machining. The drum may be first stamped in the usual manner to form the attaching portion and the cylindrical braking flange portion substantially at right angles thereto. The central hub aperture and the bolt holes may be punched or formed before or after the formation of the braking flange, the hub aperture, 2, being coaxial with the flange, so that the drum may be centered and rotated by attaching it to a rotary hub. The corrugations may be subsequently formed in the braking flange in any desired manner, and preferably without materially thinning the metal of the braking flange, after which the lip, 6f, may be pressed or rolled or bent over into the position shown in Fig. 1, or the corrugations may be pressed or formed in any other desired way and by any other desired means, as preferred.

It will be readily understood that the transverse corrugations, 5b, formed in the braking flange, 4d, will impart great strength and rigidity to the flange, which is further strengthened by the inturned lip, 6f, so that without materially increasing the weight of the drum or thickness of the metal from which it is formed, the strength and rigidity of the braking flange is greatly increased so that it will resist all braking pressures as well as the heat of friction to which it may be subjected without appreciable distortion. The transversely corrugated braking flange is provided, as shown, with a brake lining indicated at 7b, having its outer surface provided with the transversely corrugated portions, 8b, fitting the corrugated portions, 5b, of the braking flange, 4d, and located between the lip, 6f, and the attaching portion, 1b, of the drum, and extending entirely around the inner face of the flange. The inner face, 9b, is smooth and substantially cylindrical and coaxial with the axis of rotation of the drum, and when the lining is in place within the braking flange, it will provide a cylindrical friction surface to engage the brake shoes of an internal expanding brake mechanism, or other opposed friction member. The lining, 7b, may be formed of any suitable material, the particular composition of the lining forming no part of my present invention. The brake lining may be formed in suitable lengths corresponding with the internal periphery of the braking flange, and inserted therein and secured with respect thereto, or the lining may be molded, solidified and completely formed in situ in proper relation to the drum and provided with a friction surface coaxial with the axis of rotation of the drum, and hardened in position therein, in accordance with my improved process, which is covered by a separate application filed by me on or about January 10th, 1931, and given Serial Number 507,905.

Figure 7:
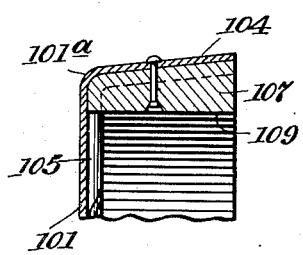
Fig. 7 is a partial sectional view of the drum shown in Fig. 4, with the friction lining in place therein.

According to my present invention, the transversely disposed corrugated portions, 8b, of the lining engage and interlock with the corrugations, 5b, of the braking flange, and this interlocking engagement will be particularly effective in preventing any possibility of relative movement in a rotary direction between the lining and the braking flange, due to the frictional engagement of the brake shoes with the inner or friction face, 9b, of the lining. Where the lining is formed in situ, it will be permanently united to the braking flange and cannot be removed from the drum, being held between the flange portions, to wit, the lip, 6f, and attaching portion, 1b, projecting inwardly from the edges of the braking flange and the transverse corrugations, 5b. Where the lining is separately formed and inserted, it may be adhesively united to the braking flange or secured thereto in any desired way if found advantageous, for example, by means of bolts or rivets in the manner indicated in Fig. 7.

Figure 2:
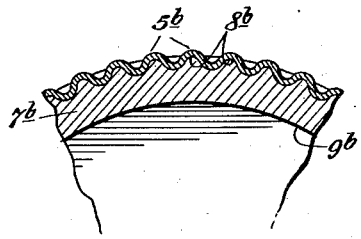
Fig. 2 is a detail section on line 2—2 of Fig. 1.
Figure 3:
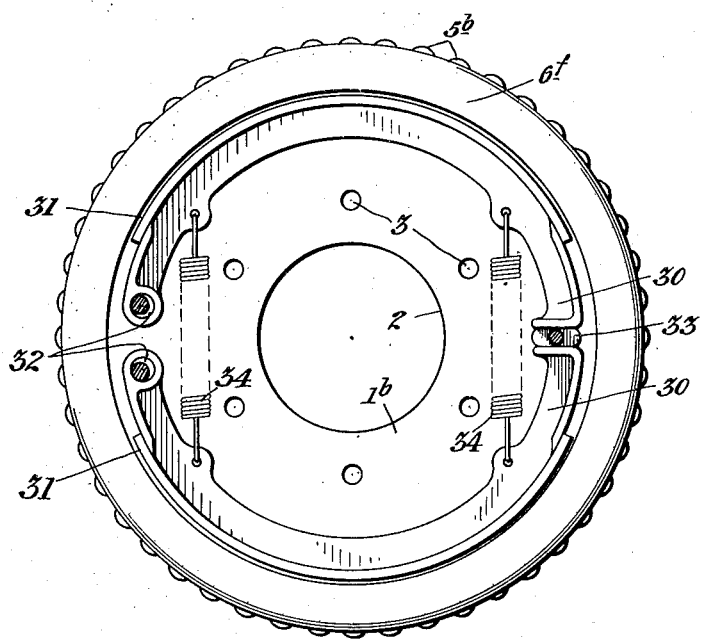
Fig. 3 is an elevation, partly in section, of an internal expanding brake assembly, including the brake drum illustrated in Figs. 1 and 2.

In Fig. 3 I have illustrated a complete brake assembly comprising the brake drum illustrated in Figs. 1 and 2, having its braking flange provided with transversely disposed distorted portions or corrugations, and provided with the lining, as hereinbefore described. In this figure, 30, 30, represent the usual expanding brake shoes which may be of any desired construction and are provided with smooth friction surfaces, 31, to engage the inner surface of the molded friction lining. The friction surfaces of the shoes do not come into contact with any portion of the drum, and the shoes are preferably made of metal of any desired degree of hardness. The friction surfaces of the shoes may be integral therewith, or they may be in the form of linings of metal or other suitable material secured to the shoes in any preferred or usual manner. In this instance each of the shoes is shown pivotally mounted at one end upon an eccentric pivot, 32, rigidly but adjustably secured to a supporting plate (not shown) adapted to be bolted to a non-rotatable member, in a well known manner, and the opposite ends of said shoes engage the usual expanding cam, 33, and are normally held in retracted position by springs, 34. The particular mounting and means for expanding the particular brake shoes form no part of my present invention. Where the friction surface of the shoes is entirely of metal, it may be made of as hard material as desired, so that the surfaces of the shoes, which are the only metallic parts exposed to friction when the brake is applied, will not be subjected to material scoring or cutting, such as is the case where the metallic friction surface is on the drum, which must necessarily be of soft metal to permit it to be formed by stamping, as previously described.

It is to be understood that the braking element, which is worn away by friction in use, may be either the lining of the drum or the brake shoes, or both as preferred. If the lining is to receive the greater wear, the drum may be relined when necessary. If, on the other hand, the brake shoes are constructed so as to wear more rapidly than the brake lining, the shoes will be replaced or provided with new friction surfaces when sufficiently worn.

It will also be noted that the heat of friction will be partially absorbed by and dissipated from the body of metal in the brake shoes while such heat as may be transmitted through the brake lining to the transversely corrugated braking flange will have no appreciable effect in distorting either the braking flange or the friction surface of the brake lining within the same, so that the area of surface contact between the braking element is not affected by the heat of friction and the efficiency of the brakes remains constant under all conditions. Furthermore, the increased strength of the transversely corrugated braking flange of the drum prevents any appreciable distortion of the flange due to braking pressure applied thereto, or the heat of friction and the corrugations increase the heat radiating surface area of the flange.

It will also be understood that any variations or inaccuracies in the formation of the drum will be compensated for by the lining, the inner face of which can always be brought into true cylindrical form coaxial with the axis of rotation of the drum.

Figure 4:
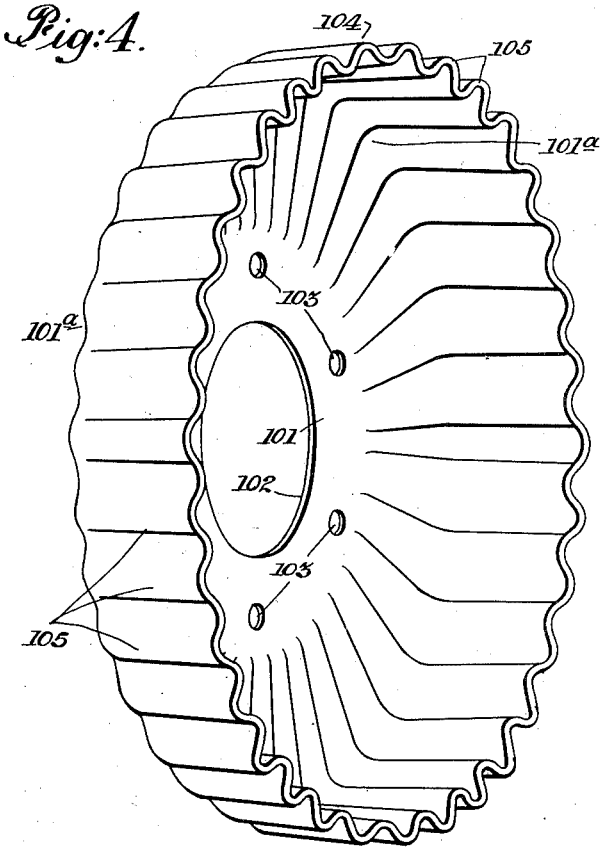
Fig. 4 is a perspective view of a modified form of brake drum, embodying my present invention.
Figure 6:
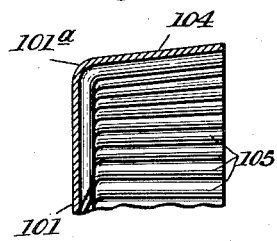
Fig. 6 is a partial sectional view of the same.
Figure 5:
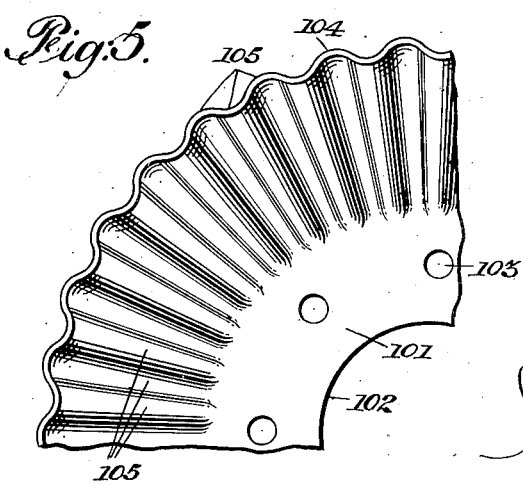
Fig. 5 is a partial side elevation of the brake drum shown in Fig. 4.

In Figs. 4, 5 and 6 I have shown a modified form of my invention, in which the brake drum comprises the attaching flange or portion, 101, having hub aperture, 102, and bolt holes, 103, or other suitable means for attaching it to a rotary part and having an integral annular braking flange, 104, substantially perpendicular thereto. In this instance the said braking flange and portions of the attaching flange are shown provided with aligned corrugations, 105, which preferably extend continuously around the angular shoulder, indicated at 101a, at the junction of the attaching portion and the braking flange, thus imparting additional strength to this shoulder. The corrugations, 105, in this instance extend radially on the attaching flange, 101, and transversely across the braking flange portion, 104, as shown. This form of brake drum may be conveniently produced from wrought metal, and preferably from sheet steel, by the operation of suitable male and female dies. By reason of the necessary "draw" of the dies, or otherwise, the transversely corrugated braking flange, 104, may be of greater diameter at its outer edge than at the shoulder, 101a, and I have so illustrated it in the drawings. In such case the brake lining, indicated at 107 in Fig. 7, which may be formed separately and pressed or inserted in the drum, or may be molded directly within the drum, will have its outer surface conform exactly to the corrugations of the braking flange and attaching flange, and any irregularities in the inner face of the braking flange, while the inner face, 109, of the lining will be truly cylindrical and coaxial with the axis of rotation of the drum. The lining may thus vary in thickness at different points to accommodate the greater diameter of the flange at its outer edge, the corrugated portions of the flange, and any irregularities or inaccuracies of the braking flange, or any lack of coaxial relation of the flange with the hub aperture, all of which are compensated for by the lining, which will give as satisfactory service as if every portion of the flange were absolutely coaxial with the drum axis.

What I claim and desire to secure by Letters Patent is:

1. A pressed sheet metal brake drum, comprising an annular braking flange provided adjacent to each edge with an inwardly extending annular flange, one of which is provided with attaching means, said braking flange being provided with a circular series of closely associated distorted portions in the form of transversely disposed corrugations, for stiffening the flange to resist distortion by brake pressure and heat of friction, and a molded friction lining for said braking flange, having its outer face transversely corrugated to fit the inner corrugated face of said braking flange, and its inner face coaxial to the axis of rotation of said drum, said lining engaging the inner faces of the said inwardly extending corrugations and being rigidly held in position with respect to the braking flange.

2. A pressed sheet metal brake drum having an annular attaching portion and an annular braking flange disposed substantially perpendicularly to the attaching portion, said braking flange being provided with transverse corrugations and said annular attaching portion being provided with radial corrugations forming continuations of the transverse corrugations of the flange, and reinforcing the junction of said flange and attaching portion.

3. A pressed sheet metal brake drum having an attaching portion provided with attaching means, and an annular braking flange disposed substantially perpendicularly to the attaching portion, said flange being provided with distorted portions disposed in lines extending transversely of the flange, and said attaching portion exterior to said attaching means being provided with distorted portions disposed in radial lines continuous with the lines of distorted portions of the flange.

4. A pressed sheet metal brake drum having an annular attaching portion and an annular braking flange disposed substantially perpendicularly to the attaching portion, said braking flange being provided with transverse corrugations and said annular attaching portion being provided with radial corrugations forming continuations of the transverse corrugations of the flange, and reinforcing the junction of said flange and attaching portion, and a molded lining for said braking flange provided with corrugated portions fitting the corrugations of the flange and of said attaching portion, and rigidly held in position with respect thereto, said lining having its inner friction face coaxial with the axis of rotation of said drum.

5. A pressed sheet metal brake drum comprising an annular attaching portion and an annular braking flange disposed substantially perpendicularly thereto, said attaching portion being provided with distorted portions to stiffen it, and said braking flange being provided with distorted portions in the form of closely associated transversely disposed corrugations to stiffen said flange, and a molded brake lining having faces engaging and fitting the inner corrugated face of the braking flange and distorted portions of the inner face of said attaching portion, and said lining having its inner face coaxial with the axis of rotation of said drum, and compensating for variations in the form of the drum.

6. A pressed sheet metal brake drum provided with an annular braking flange provided adjacent to one edge with an annular inwardly extending attaching portion provided with means for attaching it to a rotary part, said braking flange increasing in diameter outwardly from points adjacent to said attaching portion, and being provided with closely associated distorted portions in the form of corrugations extending transversely of the braking flange for stiffening said flange, an annular molded lining increasing in thickness from its inner edge toward its outer edge, and having its outer face provided with transverse corrugations corresponding with and fitting the inner corrugated face of the braking flange, and its inner face coaxial with the axis of rotation of the drum, said lining being rigidly secured with respect to said braking flange.

7. A pressed sheet metal brake drum serving as a mold for forming the lining in situ therein, and comprising an annular braking flange having its inner and outer faces provided with closely associated transversely disposed distorted portions for stiffening the flange and interlocking with the lining to prevent rotary movement thereof with respect to the drum said distorted portions correspondingly affecting the inner and outer faces of the braking flange, said braking flange being provided adjacent to each edge with an inwardly extending annular flange, one of which is provided with attaching means, said flanges precluding the possibility of removal of the lining without destroying it, and an annular friction lining molded in situ within said drum as a mold.

8. A pressed sheet metal brake drum serving as a mold for forming the lining in situ therein, comprising an annular braking flange provided adjacent to each edge with an inwardly extending annular flange, one of which flanges is provided with attaching means, said braking flange being provided on its inner and outer faces with a circular series of closely associated transversely disposed corrugations correspondingly affecting the inner and outer faces of the braking flange for stiffening the flange and for interlocking with the lining to prevent rotation thereof with respect to the drum, and an annular friction lining formed in situ in said drum as a mold in engagement with the inner faces of said braking flange and said inwardly extending flanges, the said inwardly extending flanges precluding the removal of the lining without destroying it.

CALEB S. BRAGG.